Feb. 17, 1953 A. H. ALEXANDER ET AL 2,628,821
PERCUSSION DRILL BIT BODY
Filed Oct. 7, 1950
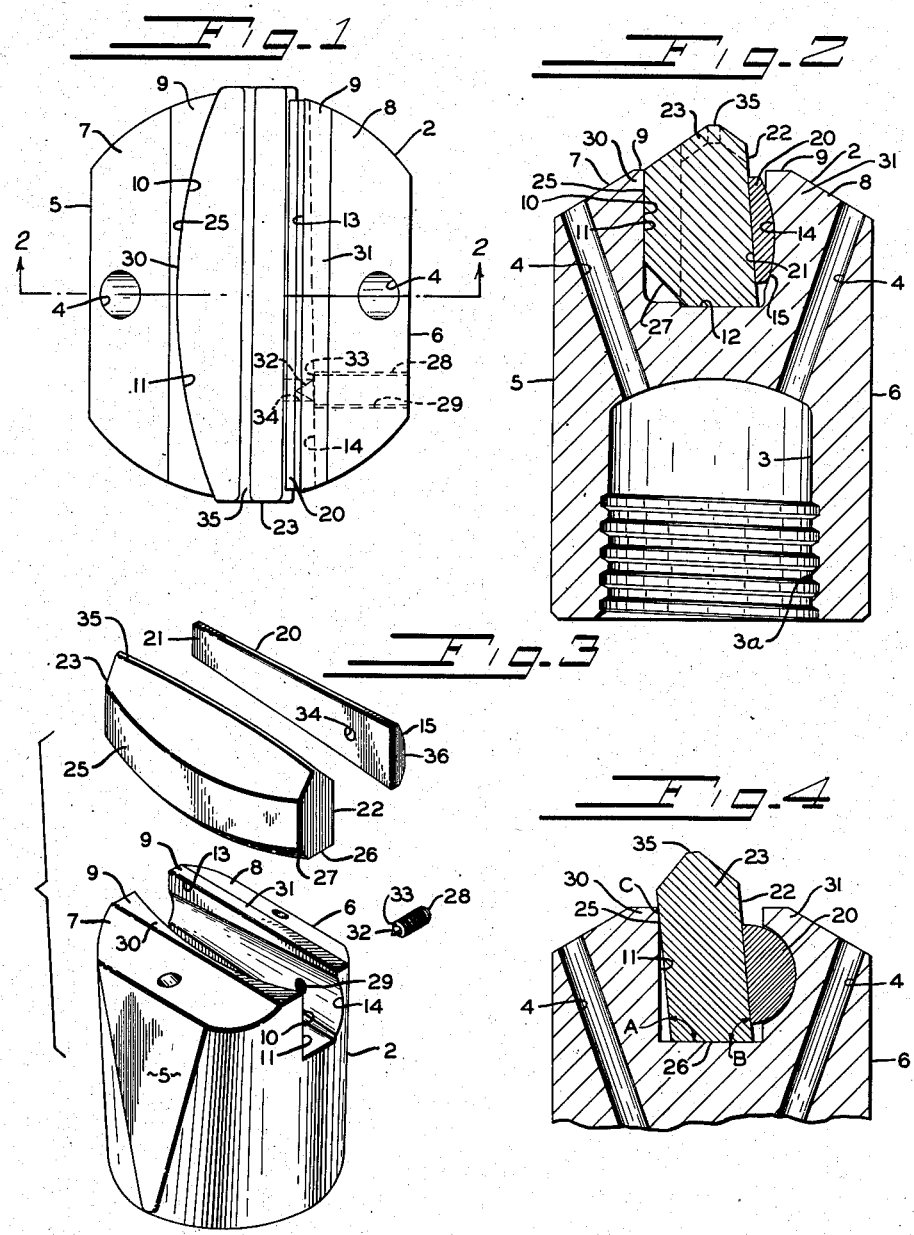
INVENTOR.
ARTHUR H. ALEXANDER
JOHN H. ALEXANDER
BY
DES JARDINS, ROBINSON & KEISER
Albert F. Robinson
THEIR ATTORNEYS Patented Feb. 17, 1953

2,628,821

UNITED STATES PATENT OFFICE 2,628,821

PERCUSSION DRILL BIT BODY

Arthur Henry Alexander and John Harold Alexander, Victoria, British Columbia, Canada, assignors to Kennametal Inc., Latrobe, Pa., a corporation of Pennsylvania Application October 7, 1950, Serial No. 188,948

20 Claims. (Cl. 255—64)

This invention relates to a percussion drill bit body for use with percussion instruments such as jack hammers, drifters, stoppers and the like in which a cutting insert is contained in a steel drill bit body and mechanically held therein against movement in any direction, the cutting insert being of harder metal, such as sintered hard carbide, than the steel bit body, and it particularly pertains to a cutting insert and clamp strip therefor with contacting side faces which are automatically aligned by the opposite side walls being seated for angular adjustment in respect to the side walls of a receiving slot in the drill bit body for the cutting insert and clamp strip.

The invention particularly pertains to those steel bit bodies in which the cutting inserts are mechanically held therein without increasing the initial holding stresses upon the drill bit body, and more especially to having the side walls of the slot in the drill bit body with seating faces for the remote side walls of the cutting insert and clamp strip being angularly adjustable to each other so that the adjacent sides of the cutting insert and clamp strip are automatically aligned in parallel contacting relation. This permits the cutting insert and the clamp strip being made with wider tolerances and with less exactness for assuring their close fitting relationship.

This invention is an improvement upon our application Serial No. 118,278, now Patent No. 2,575,438, which is incorporated as part of the instant disclosure. It sets forth that locking formations for the cutting insert have been used as they permit the selection of the most efficient heat treatment because the steel bit body can be separately heat treated prior to inserting the sintered hard carbide cutting pieces in the drill bit body. A common locking formation comprises forcing a tapered cutting body into a slot or groove formed in the working surface of the drill bit body which is of a lesser taper than the cutting piece. However, this locking formation has been unsatisfactory because the percussive forces resulting from the hammer blows from the drilling machines continually force the cutting piece into the slot or groove in the drill body, thereby increasing the stresses in the steel bit body far beyond the initial stress that is required for holding the cutting piece therein. This excessive stress in the steel drill bit body results in its rapid failure due to resulting fatigue when the pressures that are created extend beyond the point that the steel is capable of withstanding. Another objection to this kind of locking formation is that there is no means provided for preventing the cutting insert moving lengthwise in the slot or groove, except the mere frictional contact between the contacting surfaces of the drill bit body and the cutting pieces, and this is not enough to secure it against displacement.

In a drill using sintered hard tungsten carbide cutting pieces, the cost of the cutting pieces is fifty per cent or more than the cost of the steel drill bit body, particularly where the drill bit body is detachable from the drill. Accordingly, it is especially advantageous to have a drill bit body in which sintered hard carbide cutting pieces can be removed prior to fatigue failure of said steel body, thereby permitting the cutting inserts to be removed for repeated use in successive bit bodies inasmuch as the potential life of said cutting pieces and their cost are much greater than the drill bit bodies.

Our invention in the above referred to application provides for a steel drill bit body in which the cutting inserts are mechanically held therein without increasing the initial holding stresses upon the drill bit body. Accordingly, the cutting insert can be held within the drill bit body by accurately predetermined pressure and without the holding pressure for the cutting inserts fatiguing the drill bit body. Our present invention accomplishes all these objects and has the further advantage of a locking formation in which the cutting insert and clamp strip are mounted within the slot so that their abutting surfaces are automatically aligned.

Accordingly, it is the principal object of this invention to provide a steel drill bit body in which the cutting inserts, which are mechanically held therein without increasing the initial holding stresses upon the drill bit body, have the abutting surfaces of the cutting insert and the clamp strip automatically aligned.

Another object of the invention is to have the inserts and clamp strips of a construction so that they can be made with wider tolerances.

Another object of the invention is to provide a construction in which the pressure exerted against the sidewalls at the top of the slot is regulated.

Another object of the invention is to have the insert and the clamp strip angularly adjustable in respect to each other.

Further objects, and objects relating to details of construction and economies of operation will appear from the detailed description to follow. In one instance, we have accomplished the objects of our invention by the device and means described in the following specification. Our invention is clearly defined and pointed out in the appended claims. A construction constituting a preferred embodiment of our invention is illustrated in the accompanying drawings forming a part of this specification, in which:

Fig. 1 is a top plan view of a drill bit body having a cutting insert and a clamp strip embodying the invention.

Fig. 2 is a vertical cross sectional view taken on line 2—2 of Fig. 1.

Fig. 3 is an exploded view of the assembly in Fig. 1.

Fig. 4 is a cross sectional view of another embodiment of the invention showing the assembly in position before the side wing of the drill bit is placed under spring tension.

The invention generally described comprises a drill bit body having a slot in the working surface between two opposite side walls, both side walls of the slot being at a right angle with the bottom wall surface of the slot. These two side walls of the slot are parallel to the vertical axis of the drill bit body. A cutting insert of less width than the slot and adapted to be freely inserted therein has one side face inclined downwardly to be non-parallel with the adjacent side wall surface of the slot against which it is to be clamped. This same side wall of the slot is concaved lengthwise of the slot for seating the adjacent side of the cutting insert which is convexed longitudinally or lengthwise of the slot. The opposite side wall of the slot is concaved vertically for seating the side face of a clamp strip that is convexed vertically or crosswise to conform with the vertical concave surface of the seat. This permits the cutting insert and the clamp strip to be adjustable at right angles to each other, thereby permitting their abutting flat side surfaces being aligned to have close fitting contact. Accordingly, these parts may be constructed with less accuracy and with wider tolerances than would be required were this angular adjustment of the clamp strip in respect to the cutting insert not provided, and close contact of the abutting surfaces of the cutting insert and the clamp strip is assured over the entire area. The flat side of the cutting insert adjacent the clamp is slightly inclined from the vertical axis so that the insert is wider at the bottom than at the top and will be locked against vertical movement within the slot by the clamp strip.

Referring specifically to the drawings in which the same reference numerals are applied to the same parts, numeral 2 designates a drill bit body provided with a socket 3 in one end with screw threads 3a for the reception of the end of a threaded collared drill rod (not shown) to which the drill bit body 2 is secured. The manner of attachment is merely illustrative of one form of connecting the drill bit body to the drill rod as it may be attached in any conventional way or made integral with the drill rod. Opening on the working surface of the drill bit body are two passageways 4, each having their opposite ends in communication with the bottom of the socket 3 to provide channels connecting with a central channel of the drill through which fluid, such as water or air is discharged as is conventional in the art to which the invention relates. The drill bit body, made of steel, is of modified circular cross section, such modification consisting of slightly flattened opposite sides 5 and 6, and chisel-like work facing surfaces 7 and 8 converging to a truncated ridge 9 which is mutilated by a U-shaped slot 10 cut therein along the length of the truncated ridge and into the body of the working surface.

The side wall surface 11 of the slot is formed at a right angle with the bottom wall 12 of the slot but it is concaved longitudinally or lengthwise of the slot, and a portion 14 of the opposite side wall surface 13 of the slot is concaved vertically or crosswise of the length of the slot. This vertically concaved surface portion 14 is also slightly tapered lengthwise, conforming generally to the adjacent side 15 of a wedge clamp strip 20. Except for this vertically concave portion, this side wall 13 is formed at a right angle with the bottom surface 12 of the slot.

The side 15 of the clamp strip 20 is vertically convexed, and its opposite side 21 is flat for abutting against the inwardly inclined side wall 22 of a cutting insert 23 which seats within the slot with its side 25 clamped against the adjacent side wall 11 of the slot. By reason of the vertical inclination of the side wall 22 of the cutting insert to make it wider at the bottom than at the top, the wider bottom edge will be overhung by the clamp strip to lock the insert against vertical movement within the slot. The bottom edge 26 of the cutting insert seats upon the bottom wall 12 of the slot. The bottom longitudinal edge or corner of the cutting insert adjacent the side wall 25 and the bottom 26 of said insert is chamfered at 27. This relieves pressure against the side wall adjacent the base of the slot, thereby preventing fatigue of the drill bit body and breaking or cracking through the base of the wings opposite the slot. A set screw 28 is screw threadedly connected with the wall of a recess 29 formed within the wing 31. The screw has a pointed end 32 resulting in a shoulder 33 which bears against the wedge strip when the pointed end of the screw is projected into a recess 34 in the clamp strip for positively holding said clamp strip in place. A portion of the vertically convex side of the wedge strip is flattened at 36 to provide surface contact with the shoulder 33 of the clamp screw 28. After the cutting insert and the clamp strip have been assembled and aligned in the transverse slot of the drill body 2, the set screw 28 is inserted to hold the clamp strip in place therein as clamped against the cutting insert.

In the embodiment of Fig. 4, the angular increment of interference at the top of the slot between the cutting insert and the side wall 11 of the slot when the clamp strip is forced home can be obtained by having the bottom corner angle A between the side wall 25 and the bottom wall 26 of the cutting insert at an obtuse angle, and the opposite bottom corner angle B between the side wall 22 and the bottom wall 26 at an acute angle. This disposes the adjacent sides 11 and 25 normally in non-parallel relation, but when the cutting insert is clamped in place by the wedge strip 20, pressure will be exerted at the point C to place the top of the wing 30 under spring tension as portions of the sides 11 and 25 are brought into parallel relation. The angular interference at point C can be predetermined to produce the requisite amount of distortion at the top of the wing of the bit body in clamping the cutting insert within the slot to bring portions of the adjacent sides 11 and 25 in parallel relation. No pressure is exerted against the bottom of the wing adjacent the bottom of the slot, these adjacent portions being merely in contact or close together.

The cutting insert is of hard metal such as tungsten carbide with a cutting edge 35 projecting above the wings 30 and 31 of the drill bit body.

From the foregoing description it will be seen that when the cutting insert is clamped in place within the slot, with the adjacent sides 11 and 25 in contact, the overhanging portion of the wing 30 will be under spring tension near the top of the cutting insert. This results from the angle in the drill bit body between the side wall 11 and the bottom wall 12 of the slot being at a lesser angle than the angle between the bottom side 26 of the slot and the side face 25 of the cutting insert. The degree of the spring tension of the overhanging wing can be predetermined by a difference in angularity between the side wall of the slot and the adjacent side of the cutting insert. Only enough spring pressure will be exerted that is sufficient to hold the cutting insert within the slot but without any fatigue resulting from the excessive pressure to cause breakage of the wings. The cutting insert is securely held within the slot by spring grip exerted by the wings of the drill bit body and the pressure holding the cutting insert is greater at the top of the slot than at the bottom thereof. In fact the portions near the base of the slot are merely in contact with little or no lateral pressure being there exerted. The initial pressure for holding the cutting insert in place is not increased in the drilling operation but is in fact decreased as the cutting insert is then forced toward the bottom wall of the slot and away from the overhanging wall of the wing. The longitudinal convexed side of the cutting insert and the vertical convex side of the clamp strip permit them to align themselves at an angle to each other so that their abutting flat faces or sides will be parallel in contacting relation throughout their entire areas. Accordingly close fitting contact of these two abutting members is assured.

We are aware that there may be various changes in details of construction without departing from the spirit of our invention, and, therefore the invention is limited only by the appended claims.

Having thus described our invention what we claim as new and useful and desire to secure by United States Letters Patent, is:

1. The combination of a percussion drill bit body having a transverse slot therein for holding a cutting insert, said slot having a bottom wall and oppositely disposed side walls, one side wall being concaved longitudinally to the slot and the other side wall being concave transversely to the slot, an elongated cutting insert of less width than the slot having a side wall convexed in conformity with the concavity of one of the side walls of the slot, a clamp strip having a side wall convexed in conformity with the concavity of the other side wall of the slot, and means for securing the clamp strip in position with its opposite side wall aligned with the opposite side wall of the cutting insert.

2. The combination of a percussion drill as set forth in claim 1 in which the cutting insert is seated on the bottom wall of the slot.

3. The combination of a percussion drill as set forth in claim 2 in which the adjacent side walls of the slot and the cutting insert are normally disposed at different angles vertically.

4. The combination of a percussion drill as set forth in claim 3 in which the side wall of the slot adjacent the cutting insert and the adjacent side wall of the cutting insert are disposed at different angles to the base of the slot but with the angle between the side wall and the bottom wall of the slot being smaller than the angle between the side wall of the cutting insert and the bottom wall of the slot.

5. The combination of a percussion drill bit body having a transverse slot therein for holding a cutting insert, said slot having a bottom wall and oppositely disposed side walls, one side wall being concaved longitudinally to the slot and the other side wall being concaved vertically to the slot, an elongated cutting insert of less width than the slot having a side wall convexed longitudinally in conformity with the longitudinally concaved side wall of the slot, a clamp strip having a side wall convexed transversely to the slot in conformity with the transversely concaved side wall of the slot, and means for securing the clamp strip in position with its opposite side wall aligned with the opposite side wall of the cutting insert.

6. The combination of a percussion drill as set forth in claim 5 in which the cutting insert is seated on the bottom wall of the slot.

7. The combination of a percussion drill as set forth in claim 6 in which the adjacent side walls of the slot and the cutting insert are disposed at different angles to the bottom wall of the slot to relieve lateral pressure against the side walls of the slot adjacent its bottom wall.

8. The combination of a percussion drill as set forth in claim 7 in which the side wall of the slot adjacent the cutting insert is disposed at a smaller angle to the base of the slot than the adjacent side wall of the cutting insert.

9. The combination of a percussion drill bit body having a transverse slot therein for holding a cutting insert, said slot having a bottom wall and oppositely disposed side walls, one side wall being concaved longitudinally to the slot and the other side wall being concaved transversely to the slot, an elongated cutting insert of less width than the slot having one side wall convexed longitudinally in conformity with the longitudinally concave side wall of the slot and its opposite side wall being flat, a clamp strip having a side wall convexed transversely to the slot in conformity with the transversely concave side wall of the slot and its opposite side wall being flat, means securing the clamp strip in position with its flat side wall aligned with the adjacent flat side wall of the cutting insert.

10. The combination of a percussion drill as set forth in claim 9 in which the cutting insert is seated on the bottom wall of the slot.

11. The combination of a percussion drill as set forth in claim 10 in which the side wall of the slot adjacent to the cutting insert is disposed at a different angle to the bottom of the slot than is the side of the insert to relieve lateral pressure against the side walls of the slot adjacent its bottom wall.

12. The combination of a percussion drill as set forth in claim 11 in which the side wall of the slot adjacent the cutting insert is disposed at a smaller angle to the bottom of the slot than is the adjacent side wall of the cutting insert.

13. The combination of a percussion drill bit body having a transverse slot therein for holding a cutting insert, said slot having a bottom wall and oppositely disposed side walls, one of said side walls being longitudinally concave and the other side wall being vertically concave, and elongated cutting insert having a flat side wall and an opposite side wall seated against one side wall of the slot and being concave in conformity with said side wall to be angularly adjustable in one plane, a clamp strip having a flat side wall adjacent the flat side wall of the cutting insert and an opposite side wall seated against the other side wall of the slot and being concave in conformity with the said other side wall to be angularly adjustable in a plane at right angles to the plane in which the cutting insert is angularly adjustable, and means for securing the clamp strip in position with the flat side walls of the cutting insert and the clamp strip in alignment.

14. The combination of a percussion drill bit having a transverse slot therein for holding a cutting insert, said slot having a bottom wall and oppositely disposed side walls, one of said side walls being longitudinally concave and the other side wall being vertically concave, an elongated cutting insert within said slot having a flat side and an opposite side adjacent one side wall of the slot being concave in conformity with said side wall to be angularly adjustable in one plane, a clamp strip having a flat side adjacent the flat side of the cutting insert and an opposite side seated against the other wall of the slot and being concave in conformity with said other side wall to be adjustable in a plane at right angles to the plane in which the cutting insert is angularly adjustable, and means for securing the clamp strip in position with the flat sides of the cutting insert and the clamp strip in alignment.

15. The combination of a percussion drill as set forth in claim 14 in which the adjacent sides of the slot and cutting insert are at different angles to the bottom wall of the slot.

16. The combination of a percussion drill bit body having a working surface with a slot therein providing a bottom wall and upwardly extending side walls, said side walls of the slot being at right angles to the bottom wall, a cutting insert, of less width than the slot, disposed in said slot having a bottom face thereof parallel with the bottom of the slot and two opposite side wall faces, adjacent the bottom wall of the slot, normally out of contact with the side walls of the slot, a clamp strip, spaced from the bottom wall of the slot, interposed between the cutting insert and one side wall of the slot for clamping said cutting insert under tension of the side walls of the slot and remote from the bottom wall of said slot, and means for securing the clamp strip in place.

17. The combination of the percussion drill of claim 16 in which the side wall of the cutting insert and the adjacent side wall of the slot are concave longitudinally for said insert to be angularly adjustable in one plane in respect to the adjacent wall of the slot and side wall of the clamp strip and the adjacent side wall of the slot are concaved vertically for said clamp strip to be angularly adjustable at a right angle to the plane in which the cutting insert is angularly adjustable.

18. The combination of the percussion drill of claim 17 in which flat adjacent side faces are provided between the cutting insert and the clamp strip.

19. The combination of a percussion drill bit body having a working surface with a slot therein providing a bottom wall and upwardly extending side walls, a cutting insert, of less width than the slot, disposed in said slot having a bottom face thereof parallel with the bottom of the slot and two opposite side wall faces, a chamfered bottom corner formed between one of the side walls and the bottom face of the cutting insert, a clamp strip interposed between one side wall of the slot and that side wall of the cutting insert opposite the chamfered bottom corner, and means for securing the clamp strip in place.

20. The combination of a percussion drill of claim 19 in which the securing means for the clamp means is a set screw.

ARTHUR HENRY ALEXANDER.
JOHN HAROLD ALEXANDER.

REFERENCES CITED

The following references are of record in the file of this patent:

UNITED STATES PATENTS

| Number | Name | Date |
|---|---|---|
| 1,359,318 | Bernay | Nov. 16, 1920 |
| 2,101,376 | Voigtlander | Dec. 7, 1937 |
| 2,529,788 | Signell | Nov. 14, 1950 |
| 2,575,438 | Alexander et al. | Nov. 20, 1951 |

FOREIGN PATENTS

| Number | Country | Date |
|---|---|---|
| 10,750 | Great Britain | 1903 |